United States Patent
Veresov (10) Patent No.: US 9,213,562 B2
(45) Date of Patent: Dec. 15, 2015

(54) GARBAGE COLLECTION SAFEPOINT SYSTEM USING NON-BLOCKING ASYNCHRONOUS I/O CALL TO COPY DATA WHEN THE GARBAGE COLLECTION SAFEPOINT IS NOT IN PROGRESS OR IS COMPLETED

(75) Inventor: Igor Veresov, Santa Clara, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 815 days.

(21) Appl. No.: 12/972,181

(22) Filed: Dec. 17, 2010

(65) Prior Publication Data

US 2012/0159477 A1    Jun. 21, 2012

(51) Int. Cl.
G06F 9/46      (2006.01)
G06F 9/455     (2006.01)
G06F 12/02     (2006.01)

(52) U.S. Cl.
CPC ........ G06F 9/45504 (2013.01); G06F 12/0269 (2013.01)

(58) Field of Classification Search
CPC .... G06F 12/0253; G06F 17/30; G06F 9/3004
See application file for complete search history.

(56) References Cited

U.S. PATENT DOCUMENTS 5,842,016 A * 11/1998 Toutonghi et al. ............ 718/106
6,862,674 B2 * 3/2005 Dice et al. ..................... 711/170
7,610,413 B2 * 10/2009 Pope et al. ...................... 710/36
2005/0149529 A1 * 7/2005 Gutmans .......................... 707/10
2012/0089700 A1 * 4/2012 Safruti et al. .................. 709/217

OTHER PUBLICATIONS

Open JDK, "HotSpot Glossary of Terms", downloaded from openjdk.java.net/groups/hotspot/docs/HotSpotGlossary.html, on Sep. 17, 2010, 5 pages.
Hohensee, "The Hotspot Java Virtual Machine", downloaded from cs.princeton.edu/picasso/mats/HotspotOverview.pdf on Sep. 17, 2010, 129 pages.
Sun Microsystems, "Memory Management in the Java HotSpot Virtual Machine", Sun Microsystems, Apr. 2006, 21 pages.

* cited by examiner

*Primary Examiner* — Meng An
*Assistant Examiner* — Wissam Rashid
(74) *Attorney, Agent, or Firm* — Tucker Ellis LLP (57) ABSTRACT

A system and method for providing direct socket input/output (I/O) for Java in a Java Virtual Machine (JVM) environment. During runtime, the system periodically garbage collects software objects in the Java memory space or heap. In accordance with an embodiment, the system provides a means to change the state of a thread performing the I/O which temporarily disallows garbage collection from taking place, thus guaranteeing that a receiving object in the heap does not move. The use of safepoints to prohibit GC from happening during the I/O call means that a global GC lock is not required. Non-blocking I/O is utilized, while prohibiting a thread from entering a GC safepoint during an I/O system call. The technique addresses disadvantages of previous methods by removing contended locks and by removing restrictions on allocation. In accordance with an embodiment, a special thread state can be used to prevent the thread from entering a GC safepoint.

12 Claims, 5 Drawing Sheets

GARBAGE COLLECTION SAFEPOINT SYSTEM USING NON-BLOCKING ASYNCHRONOUS I/O CALL TO COPY DATA WHEN THE GARBAGE COLLECTION SAFEPOINT IS NOT IN PROGRESS OR IS COMPLETED

FIELD OF INVENTION

The present invention is generally related to virtual machines, such as Java Virtual Machines, and is particularly related to a system and method for providing direct socket input/output for Java in a virtual machine.

BACKGROUND

Within any computer system, and particularly those that include an enterprise-level software stack such as an application server running atop a virtual machine, as network speeds increase, it becomes increasingly important to optimize the path which data travels within the stack. Extra data copy operations can significantly reduce the performance of the system.

In the context of Java, and Java Virtual Machines (JVM), one approach that can be used to eliminate extra copies of objects within the Java input/output (I/O) libraries is to allow socket I/O calls to access the Java memory space or heap directly. However, in a JVM, since the heap is garbage-collected, the objects therein (in the case of I/O, a byte buffer) can move, which in turn can cause problems with the I/O.

Different virtual machine technologies have attempted to address this problem. For example, object pinning, as is used in the JRockit JVM, provides a Java language interface that allows the user to pin certain objects, thus preventing those objects from being moved by the garbage collector during garbage collection. Since the object does not move, the I/O can be performed directly. The downside of this approach is that it imposes a nontrivial overhead on allocation and garbage collection. As another example, a garbage collection (GC) locker feature, such as is used in the Hotspot JVM, provides a global locking mechanism that allows the user to temporarily disallow garbage collection from taking place, thus guaranteeing that the receiving object in the heap does not move. The downside of this approach is that the global lock is a single contention point, and therefore reduces system scalability; if the lock is held and the young generation is full, then subsequent allocation goes slow path to the old generation. These are the general areas that embodiments of the present invention are intended to address.

SUMMARY

Described herein is a system and method for providing direct socket input/output (I/O) for Java in a Java Virtual Machine (JVM) environment. During runtime, the system periodically garbage collects software objects in the Java memory space or heap. In accordance with an embodiment, the system provides a means to change the state of a thread performing the I/O which temporarily disallows garbage collection from taking place, thus guaranteeing that a receiving object in the heap does not move. The use of safepoints to prohibit GC from happening during the I/O call means that a global GC lock is not required. Non-blocking I/O is utilized, while prohibiting a thread from entering a GC safepoint during an I/O system call. The technique addresses disadvantages of previous methods by removing contended locks and by removing restrictions on allocation. In accordance with an embodiment, a special thread state can be used to prevent the thread from entering a GC safepoint.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

As described above, within any computer system, it is important to optimize the path which data travels within the stack. Extra data copy operations can significantly reduce the performance of the system. In the context of Java, and Java Virtual Machines (JVM), one approach that can be used to eliminate extra copies of objects within the Java input/output (I/O) libraries is to allow socket I/O calls to access the Java memory space or heap directly. However, in a JVM, since the heap is garbage-collected, the objects therein (in the case of I/O, a byte buffer) can move, which in turn can cause problems with the I/O. Different virtual machine technologies have attempted to address this problem, for example through the use of object pinning, or garbage collection (GC) locker. However, these techniques have disadvantages such as increased overhead or reduced scalability.

In accordance with an embodiment, described herein is a system and method for providing direct socket I/O for Java in a JVM environment. During runtime, the system periodically garbage collects software objects in the Java memory space or heap. In accordance with an embodiment, the system provides a means to change the state of a thread performing the I/O which temporarily disallows garbage collection from taking place, thus guaranteeing that a receiving object in the heap does not move. The use of safepoints to prohibit GC from happening during the I/O call means that a global GC lock is not required. Non-blocking I/O is utilized, while prohibiting a thread from entering a GC safepoint during an I/O system call. The technique addresses disadvantages of previous methods by removing contended locks and by removing restrictions on allocation. In accordance with an embodiment, a special thread state can be used to prevent the thread from entering a GC safepoint.

As referred to herein, garbage collection (GC) is the automatic management of the memory or Java heap storage within a JVM, and can utilize a variety of techniques, such as concurrent garbage collection, generational garbage collection, copying garbage collection, or compaction, each of which can be performed individually, serially, or in parallel with other garbage collection techniques. The particular details of each different garbage collection technique will be evident to one of ordinary skill in the art, and as such are not described herein. Embodiments of the present invention can be implemented to work with any form of garbage collection technique, including those described above.

As also referred to herein, sockets which are used to read and write data within the JVM, and from the operating system kernel to the Java heap, can be either blocking or non-blocking, and calls to those sockets can be respectively blocking/blocked or non-blocking/non-blocked. A call to a blocking socket is blocked until the request for data has been satisfied. When the system writes data on the socket, the read operation will then complete and execution of the program will resume. A call to a non-blocking socket requires that the system recognize the condition and act appropriately. Programs that use non-blocking sockets typically use one of two methods when sending and receiving data, e.g. polling periodically attempts to read or write data from the socket (typically using a timer), while asynchronous notification requires that the program be notified whenever a socket event takes place, so that it can in turn respond to that event.

As also referred to herein, a safepoint is a point during execution of a Java program within the JVM at which all garbage collection roots are known, and all heap object contents are consistent. From a global point of view, all of the threads executing in the JVM must block at a safepoint before the garbage collector can run (although threads running JNI code can continue to run unless they try to load or store to the Java heap, in which case they would be suspended until the end of the safepoint). From a local point of view, a safepoint is a distinguished point in a block of code where the executing thread may block for the garbage collector. Most call sites qualify as safepoints. There are strong invariants which hold true at every safepoint, and which may be disregarded at non-safepoints. Both compiled Java code and C/C++ code can be optimized between safepoints, but less so across safepoints. In some JVMs, the compiler can emit a garbage collection map at each safepoint, which the JVM can then use to identify object references.

In the context of a typical JVM environment, there may be both blocking I/O calls and non-blocking I/O calls. Some JVM, such as Hotspot, provide a GC locker feature that works with non-blocking I/O calls (but not with blocking I/O calls), and with a byte array in the Java heap. In these systems, the native Java code generally takes a lock, which inhibits garbage collection globally, performs a non-blocking call, and allows the data to be transferred to the Java heap, after which the lock is released. When the JVM wants to perform a garbage collection, it similarly acquires a write lock, waits for all read locks to be given up, and then performs the garbage collection.

However, locks provided by features such as GC locker can be held simultaneously by many threads, so different threads can potentially prohibit other threads from making a write to the heap. Additionally, no similar feature is provided for blocking I/O calls. Workarounds may include reading to the buffer in C heap with a blocking call, and then copying the buffer from C heap to Java heap, taking a GC locker lock to prohibit garbage collection, but such workarounds add additional overhead.

In accordance with an embodiment, the system allows blocking calls to be replaced with non-blocking calls. From the point of view of a Java user, the call is a blocking send-and-receive, but under the hood it is a non-blocking send-and-receive. The system can work with any operating system (O/S) that allows verification of whether data can be written to/read from a socket, such as the Poll( ) system call provided in Unix.

Application threads can have different states associated therewith, which the system can change to allow or to inhibit garbage collection. For example, in a typical JVM, the threads may be associated either with state Thread_In_Native (wherein native code and garbage collection can happen at any point of execution); or state Thread_In_Java (wherein the thread is executing interpreted or compiled Java code and garbage collection can only happen at safepoints). If a Poll( ) or Recv( ) function is invoked, to determine if there is data in the kernel to be read, and the thread is in state Thread_In_Java or state Thread_In_Native, then garbage collection can potentially happen, which can lead to the I/O problems described at the outset.

In accordance with an embodiment, prior to execution an I/O operation the thread state is instead changed to a new state Thread_No_GC, in which the system generally prohibits garbage collection from happening. The change of state is delayed and the thread is blocked if a garbage collection was requested, and a garbage collection is performed. This technique guarantees that the system can get the pointer to the byte array in Java heap, and quickly copy data from the buffer and kernel to the Java heap. After copying the data from the kernel to the heap, the thread state is then changed back from state Thread_No_GC to state Thread_In_Native, so that garbage collection can again potentially happen at any point of execution.

In accordance with an embodiment, the thread state Thread_No_GC can be similar to the thread state Thread_In_Java, but is used by the system only to prohibit entering safepoints that would move objects, and not to prohibit entering other types of safepoints that might normally happen in the virtual machine at runtime.

In accordance with an embodiment, the JVM can include an application program interface (API), such as the Java Native Interface (JNI), or another interface, which can be modified to allow the state Thread_No_GC to be invoked on one or more (or all) threads. For example, thread state changes can be invoked by a Java user or code with a "prohibit GC safepoints", to which the system can respond with the above procedure.

Figure 1:
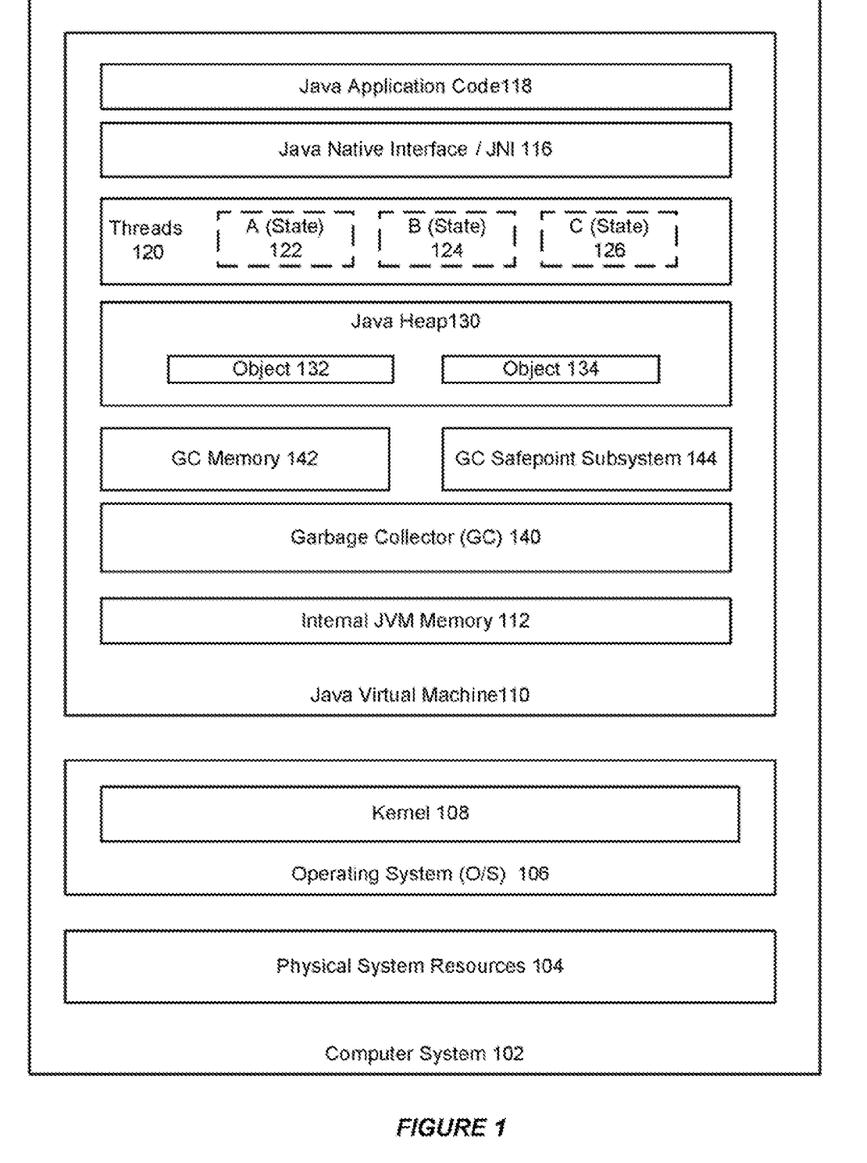
FIG. 1 illustrates a system which allows for direct socket I/O for Java in a Java Virtual Machine (JVM) environment, in accordance with an embodiment.

FIG. 1 illustrates a system which allows for direct socket I/O for Java in a Java Virtual Machine (JVM) environment, in accordance with an embodiment. As shown in FIG. 1, a typical system can include a computer system 102, which in turn includes physical system resources 104, such as processor, memory, storage and networking devices, and an operating system 106 with a kernel 108. The computer system can host one or multiple JVM 110, although for clarity only a single JVM is shown in the figure. In accordance with an embodiment, the JVM can include an internal JVM memory 112, and a native application program interface (API), such as a modified Java Native Interface (JNI) 116, that allows a Java program or application code 118 to run within the JVM. Program execution is performed by a plurality of threads 120 (illustrated here as threads A 122, B 124 and C 126, each with an associated thread state). Program objects and data are allocated as objects 132, 134 in the memory space or heap 130. During runtime, a garbage collector 140, in combination with a transient garbage collection memory 142 and a garbage collection GC safepoint subsystem (sometimes referred to as a "safepoint mechanism") 144, performs garbage collection on objects in the heap, utilizing any of the various garbage collection techniques such as concurrent garbage collection, generational garbage collection, copying garbage collection, compaction, or other garbage collection techniques described above.

It will be evident that, depending on the particular JVM environment used, and in accordance with other embodiments, different components can be included within the JVM.

Figure 2:
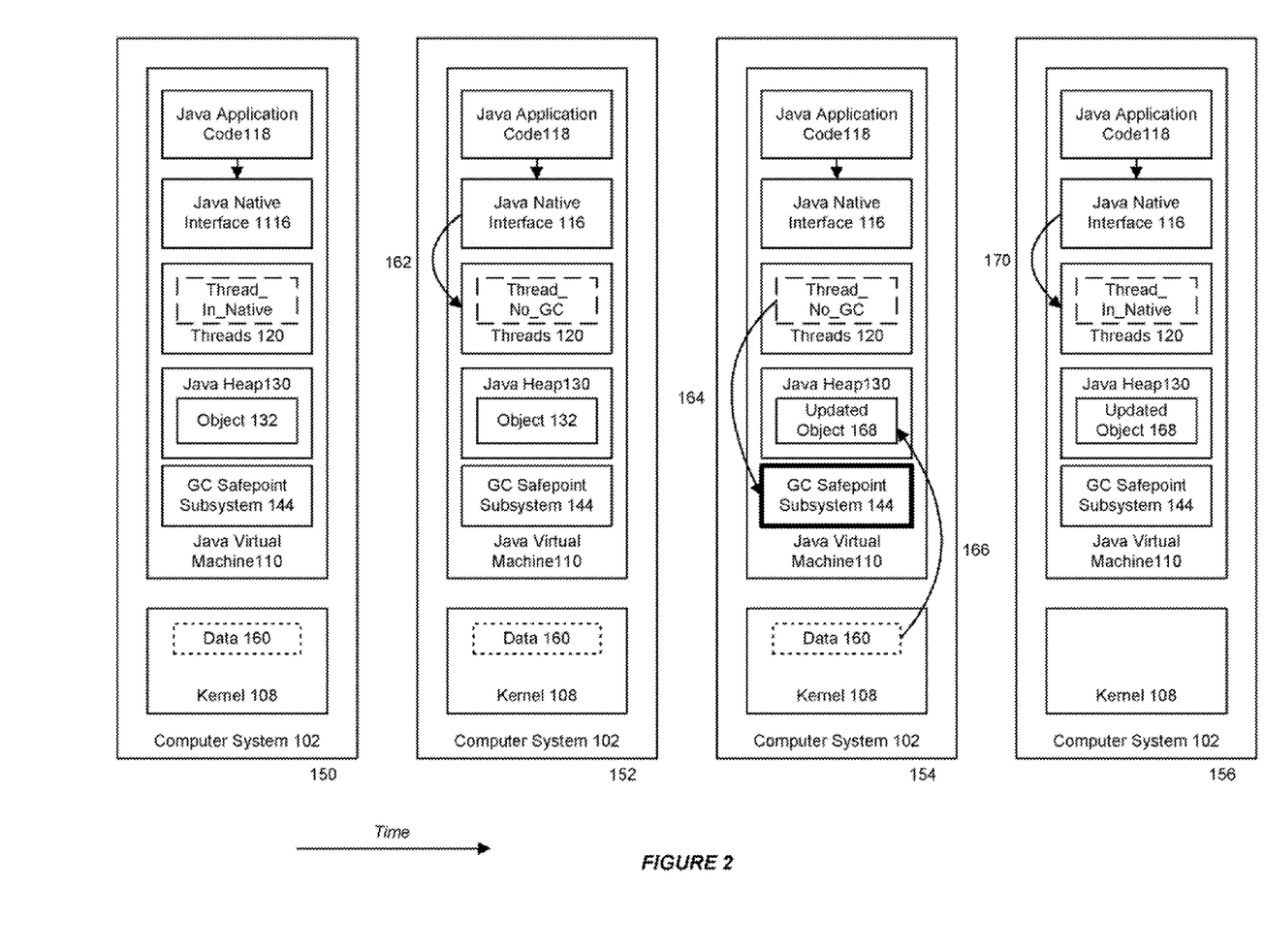
FIG. 2 illustrates how the system can be used to provide for direct socket I/O for Java, in accordance with an embodiment.

FIG. 2 illustrates how the system can be used to provide for direct socket I/O for Java, in accordance with an embodiment. As shown in FIG. 2, which for clarity omits some of the components described above, over time 150, 152, 154, 156, Java program execution is performed by the plurality of threads 120, each of which have a state associated therewith. The program objects and data are again allocated as objects 132 in the memory space or heap 130 of the JVM. During runtime, data 160 becomes available at the kernel (e.g. in the kernel buffer), to be read/written to the Java heap. In accordance with an embodiment, the program's thread state is changed 162 from state Thread_In_Native to state Thread_No_GC. The GC safepoint subsystem 144 then determines whether a GC safepoint is in progress. If it is determined that a GC safepoint is in progress, the safepoint subsystem blocks 164 until that safepoint has been completed. If instead it is determined that a GC safepoint is not in progress, then the system acquires a pointer to the kernel byte array, or otherwise copies data directly 166 from the kernel buffer to the Java heap, to update the object 168. After the data has been copied, the program's thread state is then changed back 170 from state Thread_No_GC to state Thread_In_Native, and the process repeats.

Figure 3:
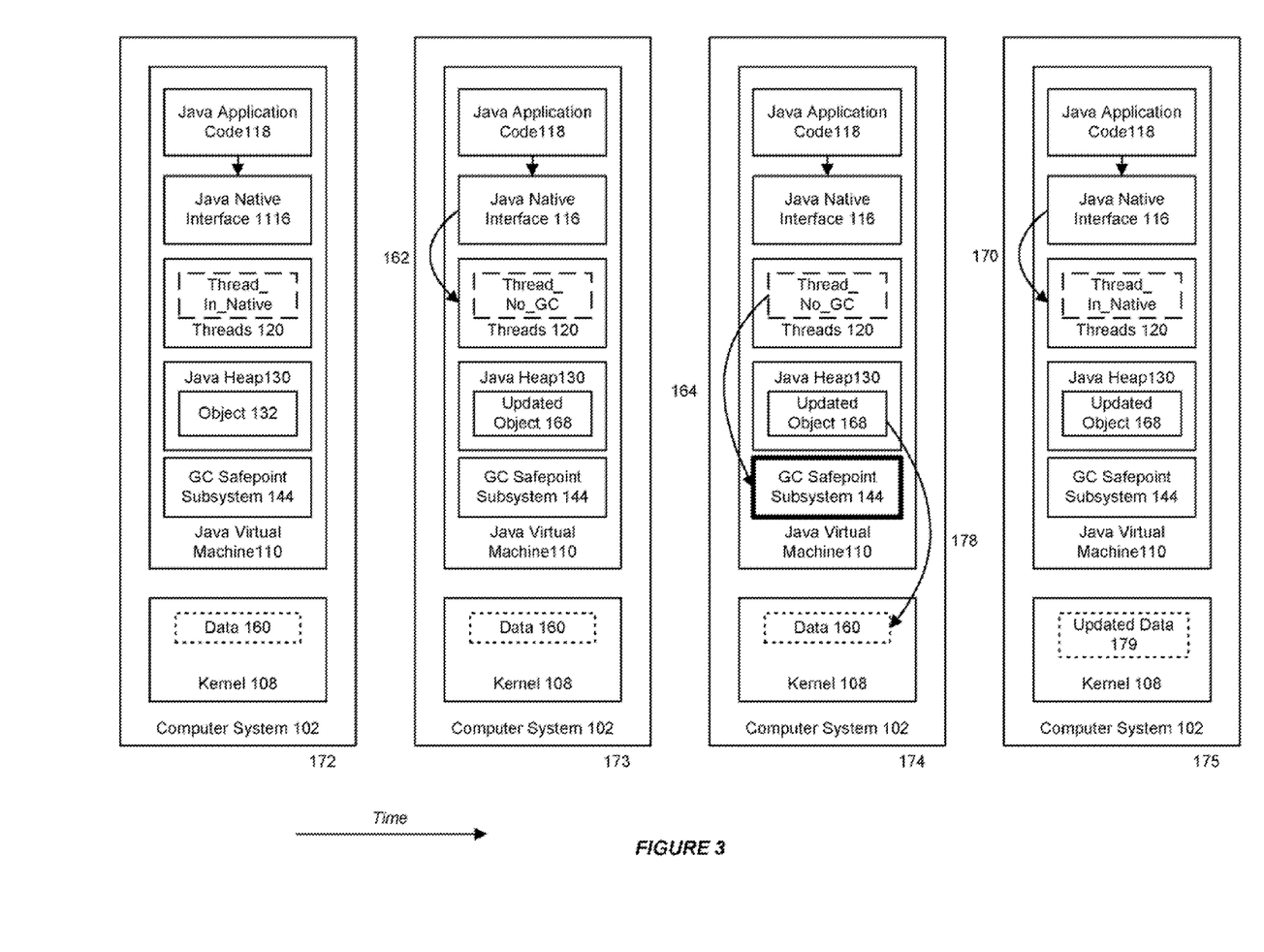
FIG. 3 illustrates how the system can be used to provide for direct socket I/O to send data, in accordance with an embodiment.

The above example illustrates how data can be received at the Java heap from the kernel space. The technique can be similarly used to enable sending of data from the Java heap to the kernel space. For example, FIG. 3 illustrates how the system can be used over time 172, 173, 174, 175 to provide for direct socket I/O to send data, in accordance with an embodiment. As shown therein, when an object is updated at the Java heap, the program's thread state can be again changed from state Thread_In_Native to state Thread_No_GC. If it is determined that a GC safepoint is in progress, the safepoint subsystem blocks until that safepoint has been completed. If instead it is determined that a GC safepoint is not in progress, then the system can copy data directly 178 from the Java heap to the kernel, to update the data 179 at the kernel.

Figure 4:
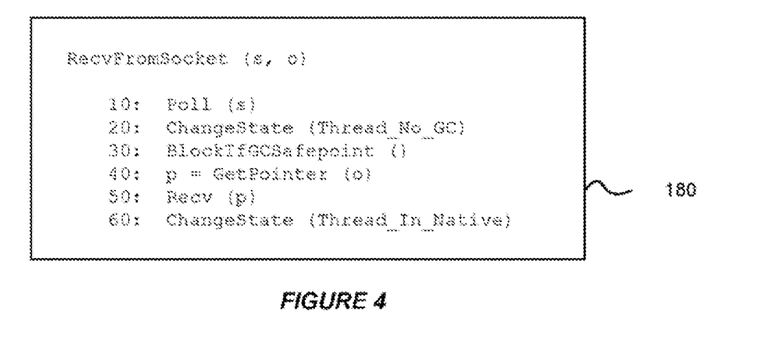
FIG. 4 illustrates an example pseudocode, for controlling direct socket I/O for Java, in accordance with an embodiment.

FIG. 4, which is also reproduced below, illustrates an example pseudocode 180, for controlling direct socket I/O for Java, in accordance with an embodiment.

---
RecvFromSocket(s, o)
---
10: Poll(s)
20: ChangeState(Thread_No_GC)
30: BlockIfGCSafepoint( )
40: p = GetPointer(o)
50: Recv(p)
60: ChangeState(Thread_In_Native)
---

In the above example, which illustrates a typical receive from socket, line 10 executes a Poll( ) system call on a socket, that determines whether there's any data in the kernel buffer available to read. This call is blocking, and the current thread is in such a state at the moment that allows safepoints to occur. So, while Poll( ) is blocked a GC safepoint can happen and the object "o" can move. On line 20 a ChangeState( ) function (which can be added to the JNI interface) is executed, that changes the state of thread so that it cannot enter a GC safepoint until it cooperates. The state is similar to a regular Java thread state, but only prevents the thread from entering a GC-only safepoint. On line 30 the system checks if a GC safepoint is in progress or has been requested in which case the system cooperates and blocks until the safepoint is completed. In accordance with an embodiment, the function BlockIfGCSafepoint( ) is configured so that it changes the thread state from Thread_No_GC to Thread_In_Native, so that the GC safepoint can proceed, and then back to Thread_No_GC when the safepoint is complete. On lines 40 and 50, the system acquires the pointer to the byte array (the "o" parameter) and does an non-blocking system call to copy data from kernel space directly to Java heap. On line 60 the system transitions back to the native thread state, allowing the thread to enter safepoints at any time.

An equivalent example pseudocode, for enabling sending of data from the Java heap to the kernel space, is shown below.

---
SendToSocket(s, o)
---
10: Poll(s)
20: ChangeState(Thread_No_GC)
30: BlockIfGCSafepoint( )
40: p = GetPointer(o)
50: Send(p)
60: ChangeState(Thread_In_Native)
---

The above-described technique provides several advantages over traditional methods. By executing BlockIfGCSafepoint( ) the thread actually enters the safepoint (as if it were a typical Java thread or a JNI thread that tried to resolve a handle during a safepoint), if and only if the safepoint is a GC safepoint. This allows systems, such as JRockit, Hotspot or other JVMs, to provide this functionality within their existing safepoint environments, without requiring any additional synchronization, and while eliminating an extra GC lock. In particular, there is no overhead on the allocation and garbage collection as compared to object pinning techniques; there is no single point of contention as compared to traditional GC locker techniques—all thread state transitions can be implemented lock-free; and there are no restrictions on allocation as compared to traditional GC locker techniques.

The above-described pseudocode examples are provided for purposes of illustrating these techniques in a Unix environment. It will be evident that, in accordance with other different embodiments, different forms of coding can be used to perform similar functionality.

Figure 5:
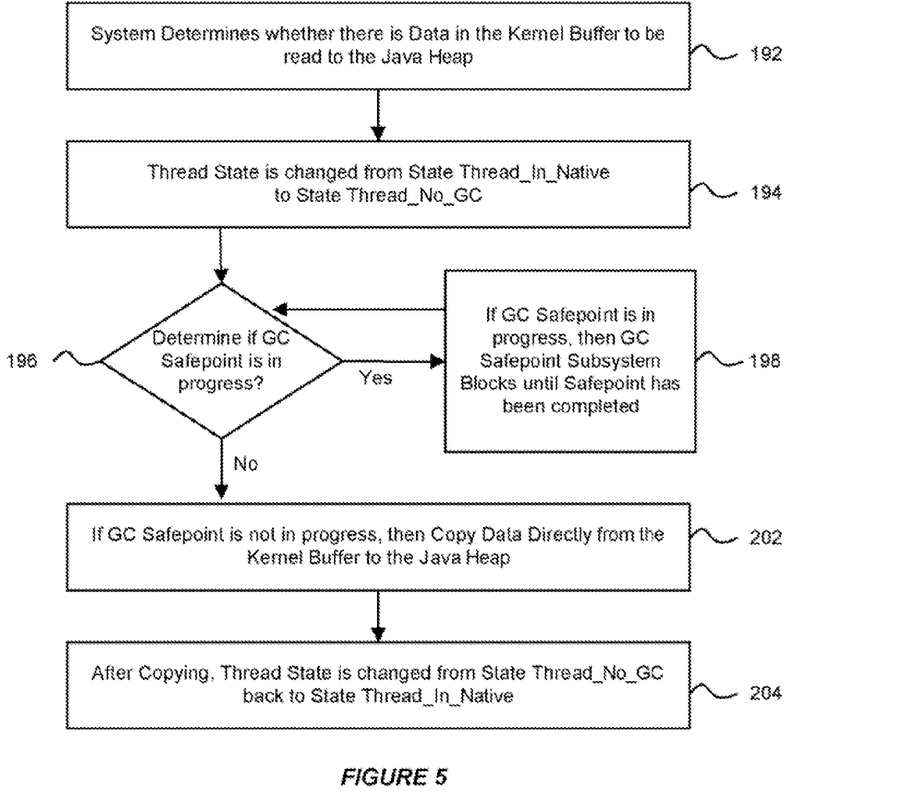
FIG. 5 is a flowchart of a method for performing direct socket I/O for Java, in accordance with an embodiment.

FIG. 5 is a flowchart of a method for performing direct socket I/O for Java, in accordance with an embodiment. As shown in FIG. 5, at step 192, the system determines whether there is data in the kernel (e.g. in the kernel buffer), which needs to be read/written to the heap. At step 194, the program's thread state is changed from state Thread_In_Native to state Thread_No_GC. At step 196, the GC safepoint subsystem determines whether a GC safepoint is in progress. If, at step 198, the system determines that a GC safepoint is in progress, then the GC safepoint subsystem blocks until that safepoint has been completed. If instead, at step 200, the system determines that a GC safepoint is not in progress, then the system acquires a pointer to the kernel byte array, or otherwise copies data directly from the kernel buffer to the Java heap. At step 204, after the data has been copied, the program's thread state is changed back from state Thread_No_GC to state Thread_In_Native, and the process repeats.

The above-described thread states are provided for purposes of illustration. It will be evident that, depending on the particular JVM environment used, and in accordance with other embodiments, different types of thread state can be used, to provide similar functionality.

Figure 6:
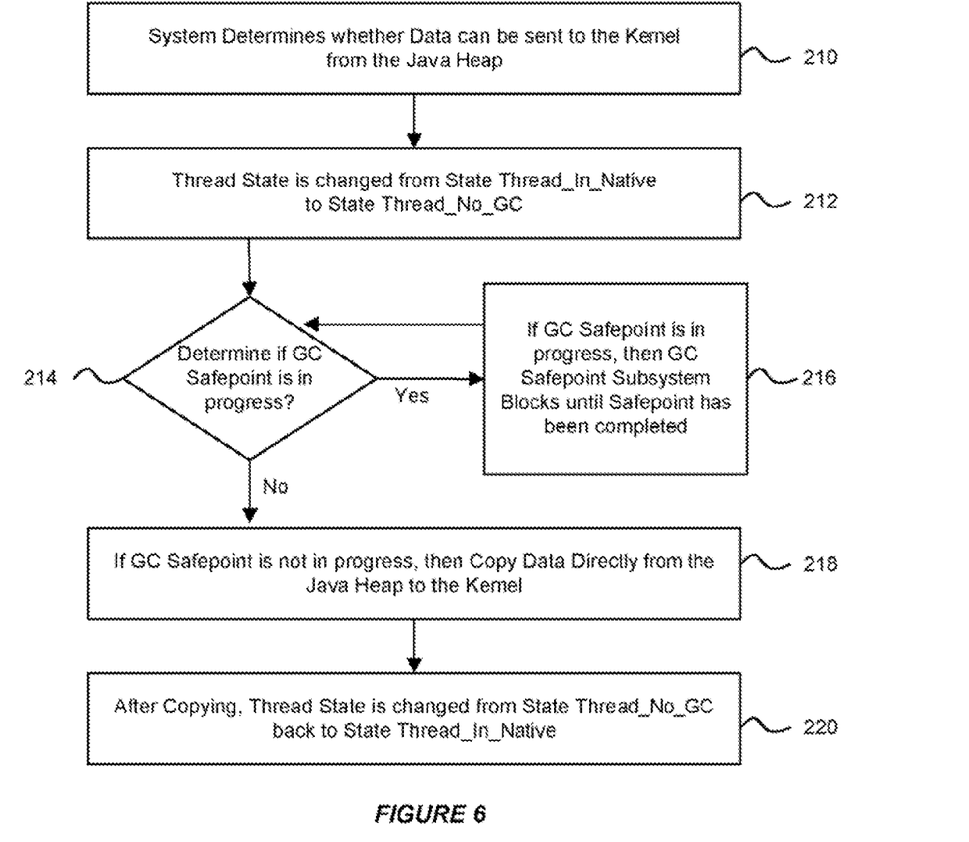
FIG. 6 is a flowchart of a method for performing direct socket I/O to send data, in accordance with an embodiment.

Again, the above example illustrates how data can be received at the Java heap from the kernel space, and can be similarly used to enable sending of data from the Java heap to the kernel space. For example, FIG. 6 is a flowchart of a method for performing direct socket I/O to send data, in accordance with an embodiment. As shown therein, at step 210, the system determines whether there is buffer space available in the kernel. At steps 212-216, the program's thread state is changed from state Thread_In_Native to state Thread_No_GC; the GC safepoint subsystem determines whether a GC safepoint is in progress; and if so blocks until that safepoint has been completed. If, at step 218, the system determines that a GC safepoint is not in progress, then the system copies data directly from the Java heap to the kernel. At step 220, after the data has been copied, the program's thread state is changed back from state Thread_No_GC to state Thread_In_Native, and the process repeats.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system comprising:
    a computer system including a memory, a kernel having a kernel buffer, and one or more processors;
    one or more virtual machines, provided on the computer system, for use in executing a program, wherein each virtual machine includes:
        a plurality of threads operating within the virtual machine, for executing the program, each of which thread of said plurality of threads has an associated thread state,
        a memory space which stores program objects associated with said program and data objects associated with said program, and
        a garbage collector that periodically performs a garbage collection process on said program objects and said data objects in the memory space; and
        a garbage collection (GC) safepoint subsystem that is used to control the garbage collection process by establishing one or more garbage collection (GC) safepoint which is a point where all of said plurality of threads block before said garbage collector performs the garbage collection process on said program objects and said data objects in the memory space;
    wherein, when, during execution of a first thread of said plurality of threads, the first thread invokes a poll function to determine if there is kernel buffer data at the kernel buffer ready to be written to the memory space, and if such kernel buffer data exists, the thread state associated with said first thread is changed to a first thread state which prohibits said first thread from entering a GC safepoint of said one or more GC safepoint,
    if a GC safepoint of said one or more GC safepoint is in progress when the first thread invokes a poll function to determine if there is kernel buffer data at the kernel buffer ready to be written to the memory space then said first thread is blocked until said GC safepoint which is in progress when the first thread invokes a poll function to determine if there is kernel buffer data at the kernel buffer ready to be written to the memory space has been completed, and
    after said GC safepoint which is in progress when the first thread invokes a poll function to determine if there is kernel buffer data at the kernel buffer ready to be written to the memory space has been completed or immediately if no GC safepoint of said one or more GC safepoint is in progress the first thread initiates copying of the kernel buffer data directly from the kernel buffer to the memory space using a non-blocking asynchronous I/O call, and after completion of copying the kernel buffer data, changes the thread state associated with said first thread to a second thread state which permits said first thread to enter any GC safepoint of said one or more GC safepoint;
    wherein, when, during execution of a second thread of said plurality of threads, the second thread invokes a poll function to determine if there is memory space data in the memory space ready to be read into to the kernel buffer, and such memory space data exists, the thread state associated with said second thread is changed to said first thread state which prohibits said second thread from entering a GC safepoint of said one or more GC safepoint,
    if a GC safepoint of said one or more GC safepoint is in progress when the second thread invokes a poll function to determine if there is memory space data in the memory space ready to be read into to the kernel buffer then said second thread is blocked until said GC safepoint which is in progress has been completed, and
    after said GC safepoint which is in progress when the second thread invokes a poll function to determine if there is memory space data in the memory space ready to be read into to the kernel buffer has been completed or immediately if no GC safepoint of said one or more GC safepoint is in progress, the second thread initiates copying of the memory space data directly from the memory space to the kernel buffer using a non-blocking asynchronous I/O call, and after completion of copying the memory space data, changes the thread state associated with said second thread to said second thread state which permits said second thread to enter any GC safepoint of said one or more GC safepoint.

2. The system of claim 1, wherein each GC safepoint of said one or more GC safepoint is a point during program execution of one of said plurality of threads at which all of said program objects and data objects in the memory space are consistent with associated objects in the kernel buffer.

3. The system of claim 2, wherein the GC safepoint subsystem requires all of said plurality of threads to block at any GC safepoint of said one or more GC safepoint before enabling said garbage collector to perform the garbage collection process on said program objects and said data objects in the memory space.

4. The system of claim 1, wherein the second thread state is a Thread_ln_Native thread state.

5. The system of claim 1, wherein:
said one or more virtual machine comprise one or more Java Virtual Machines;
said program is a Java program; and
said memory space is a Java heap.

6. A method comprising:
providing, at a computer system including one or more processors, memory, and kernel having a kernel buffer, one or more virtual machines, for use in executing a program, wherein each virtual machine includes,
a plurality of threads for executing the program, wherein each thread of the plurality of threads has an associated thread state,
a memory space which stores program objects associated with said program and data objects associated with said program,
a garbage collector that periodically performs a garbage collection process on said program objects and data objects in the memory space, and
a garbage collection (GC) safepoint subsystem that is used to control the garbage collection process;
establishing with the GC safepoint subsystem one or more garbage collection (GC) safepoint which is a point where all of said plurality of threads block before said garbage collector performs the garbage collection process on said program objects and said data objects in the memory space;
invoking, in a first thread of said plurality of threads, a poll function to determine if there is kernel buffer data at the kernel buffer ready to be written to the memory space, and when such kernel buffer data exists, changing the thread state associated with said first thread to a first thread state which prohibits said first thread from entering a GC safepoint of said one or more GC safepoint;
blocking said first thread if a GC safepoint of said one or more GC safepoint is in progress when invoking the poll function to determine if there is kernel buffer data at the kernel buffer ready to be written to the memory space until said GC safepoint which is in progress when invoking the poll function to determine if there is kernel buffer data at the kernel buffer ready to be written to the memory space has been completed, and
after said GC safepoint which is in progress when invoking the poll function to determine if there is kernel buffer data at the kernel buffer ready to be written to the memory space has been completed or immediately if no GC safepoint of said one or more GC safepoint is in progress, initiating copying of the kernel buffer data directly from the kernel buffer to the memory space using a non-blocking asynchronous I/O call of the first thread, and after completion of copying the kernel buffer data, changing the thread state associated with said first thread to a second thread state which permits said first thread to enter any GC safepoint of said one or more GC safepoint;
invoking, in a second thread of said plurality of threads, a poll function to determine if there is memory space data in the memory space ready to be written to the kernel buffer, and when such memory space data exists, changing the thread state associated with said second thread to the first thread state which prohibits said second thread from entering a GC safepoint of said one or more GC safepoint;
blocking said second thread if a GC safepoint of said one or more GC safepoint is in progress when invoking a poll function to determine if there is memory space data in the memory space ready to be written to the kernel buffer until said GC safepoint which is in progress when invoking a poll function to determine if there is memory space data in the memory space ready to be written to the kernel buffer has been completed, and
after said GC safepoint which is in progress when invoking a poll function to determine if there is memory space data in the memory space ready to be written to the kernel buffer has been completed or immediately if no GC safepoint of said one or more GC safepoint is in progress, initiating copying of the memory space data directly from the memory space to the kernel buffer using a non-blocking asynchronous I/O call of the second thread, and after completion of copying the memory space data, changing the thread state associated with said second thread to the second thread state which permits said second thread to enter any GC safepoint of said one or more GC safepoint.

7. The method of claim 6, wherein each GC safepoint of said one or more GC safepoint is a point during program execution of one of said plurality of threads at which all of said program and data objects in the memory space are consistent with associated objects in the kernel buffer.

8. The method of claim 7, further comprising:
determining when all of said plurality of threads have blocked at any GC safepoint of said one or more GC safepoint and enabling said garbage collector to perform the garbage collection process on said program objects and said data objects in the memory space.

9. The method of claim 6, wherein the second thread state is a Thread-In-Native thread state.

10. The method of claim 6, wherein:
said one or more virtual machine comprise one or more Java Virtual Machines;
said program is a Java program; and
said memory space is a Java heap.

11. A non-transitory computer readable storage medium, including instructions stored thereon which, when read and executed by a computer, cause the computer to perform steps comprising:
providing, at a computer system including one or more processors, memory, and kernel having a kernel buffer, one or more virtual machines, for use in executing a program, wherein each virtual machine includes,
a plurality of threads for executing the program, wherein each thread of the plurality of threads has an associated thread state,
a memory space which stores program objects associated with said program and data objects associated with said program, a garbage collector that periodically performs a garbage collection process on said program objects and data objects in the memory space, and a garbage collection (GC) safepoint subsystem that is used to control the garbage collection process;

establishing with the GC safepoint subsystem one or more garbage collection (GC) safepoint which is a point where all of said plurality of threads block before said garbage collector performs the garbage collection process on said program objects and said data objects in the memory space;

invoking, in a first thread of said plurality of threads, a poll function to determine if there is kernel buffer data at the kernel buffer ready to be written to the memory space, and when such kernel buffer data exists, changing the thread state associated with said first thread to a first thread state which prohibits said first thread from entering a GC safepoint of said one or more GC safepoint;

blocking said first thread if a GC safepoint of said one or more GC safepoint is in progress when invoking the poll function to determine if there is kernel buffer data at the kernel buffer ready to be written to the memory space until said GC safepoint which is in progress when invoking the poll function to determine if there is kernel buffer data at the kernel buffer ready to be written to the memory space has been completed, and after said GC safepoint which is in progress when invoking the poll function to determine if there is kernel buffer data at the kernel buffer ready to be written to the memory space has been completed or immediately if no GC safepoint of said one or more GC safepoint is in progress, initiating copying of the kernel buffer data directly from the kernel buffer to the memory space using a non-blocking asynchronous I/O call of the first thread, and after completion of copying the kernel buffer data, changing the thread state associated with said first thread to a second thread state which permits said first thread to enter any GC safepoint of said one or more GC safepoint;

invoking, in a second thread of said plurality of threads, a poll function to determine if there is memory space data in the memory space ready to be written to the kernel buffer, and when such memory space data exists, changing the thread state associated with said second thread to the first thread state which prohibits said second thread from entering a GC safepoint of said one or more GC safepoint;

blocking said second thread if a GC safepoint of said one or more GC safepoint is in progress when invoking a poll function to determine if there is memory space data in the memory space ready to be written to the kernel buffer until said GC safepoint which is in progress when invoking a poll function to determine if there is memory space data in the memory space ready to be written to the kernel buffer has been completed, and after said GC safepoint which is in progress when invoking a poll function to determine if there is memory space data in the memory space ready to be written to the kernel buffer has been completed or immediately if no GC safepoint of said one or more GC safepoint is in progress, initiating copying of the memory space data directly from the memory space to the kernel buffer using a non-blocking asynchronous I/O call of the first thread, and after completion of copying the memory space data, changing the thread state associated with said second thread to the second thread state which permits said second thread to enter any GC safepoint of said one or more GC safepoint.

12. The non-transitory computer readable storage medium of claim 11, including further instructions stored thereon, which when read and executed by a computer, cause the computer to perform further steps comprising:

determining when all of said plurality of threads have blocked at any GC safepoint of said one or more GC safepoint and enabling said garbage collector to perform the garbage collection process on said program objects and said data objects in the memory space.

\* \* \* \* \*